(12) United States Patent
Kim et al.

(10) Patent No.: US 10,424,229 B2
(45) Date of Patent: Sep. 24, 2019

(54) FLEXIBLE DISPLAY DEVICE

(71) Applicant: LG DISPLAY CO., LTD., Seoul (KR)

(72) Inventors: JeongHun Kim, Gyeonggi-do (KR); PyungYong Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/208,419

(22) Filed: Dec. 3, 2018

(65) Prior Publication Data

US 2019/0172377 A1 Jun. 6, 2019

(51) Int. Cl.
*G09F 9/30* (2006.01)
*H04M 1/02* (2006.01)
*G06F 1/16* (2006.01)
*G02F 1/1333* (2006.01)

(52) U.S. Cl.
CPC ........ *G09F 9/301* (2013.01); *G02F 1/133305* (2013.01); *G06F 1/1652* (2013.01); *H04M 1/0268* (2013.01)

(58) Field of Classification Search
CPC ..... G06F 1/1652; H04M 1/0268; G09F 9/301
See application file for complete search history.

(56) References Cited

U.S. PATENT DOCUMENTS

| | | | | |
|---|---|---|---|---|
| 7,395,850 B2 * | 7/2008 | Chino | ............. | E06B 9/54 160/243 |
| 7,667,962 B2 * | 2/2010 | Mullen | ............. | G06F 1/1624 361/679.56 |
| 7,724,508 B2 * | 5/2010 | Bemelmans | ........ | G06F 1/1615 345/168 |
| 8,009,422 B2 * | 8/2011 | Misawa | ........... | G02F 1/133305 345/156 |
| 8,184,369 B2 * | 5/2012 | Kuroi | ............. | G03B 21/58 359/443 |
| 8,654,519 B2 * | 2/2014 | Visser | ............. | G09F 9/00 361/679.21 |
| 9,337,434 B2 * | 5/2016 | Lindblad | .......... | H01L 51/52 |
| 9,823,697 B2 * | 11/2017 | Hsu | ............. | G06F 1/1618 |
| 9,874,905 B2 * | 1/2018 | Song | ............. | G06F 1/1652 |
| D819,020 S * | 5/2018 | Choi | ............. | D14/341 |
| 10,019,036 B2 * | 7/2018 | Sun | ............. | G06F 3/041 |
| 10,257,945 B2 * | 4/2019 | Kim | ............. | G09F 9/301 |
| 2002/0090980 A1 * | 7/2002 | Wilcox | .......... | G06F 1/1601 455/566 |
| 2004/0183958 A1 * | 9/2004 | Akiyama | ........ | G02F 1/133305 349/58 |
| 2005/0041012 A1 * | 2/2005 | Daniel | ........... | G06F 1/1601 345/156 |
| 2009/0302176 A1 * | 12/2009 | Kuroi | ............. | F16M 11/38 248/176.3 |

(Continued)

*Primary Examiner* — Adrian S Wilson
(74) *Attorney, Agent, or Firm* — Polsinelli PC

(57) ABSTRACT

A flexible display device includes a plurality of back bars coupled to the rear surface of a display panel, and a spacing member disposed up to a boundary between a non-display area and a display area such that the display panel can be prevented from being scratched and damaged by friction during the rolling of the display panel. According to the aspects disclosed herein, in a flexible display device capable of implementing a rollable display or a foldable display, when rolling a display panel, it is possible to prevent the display panel from being scratched or damaged.

23 Claims, 10 Drawing Sheets

(56) References Cited

U.S. PATENT DOCUMENTS

| | | | |
|---|---|---|---|
| 2012/0204453 A1* | 8/2012 | Jung | G09F 9/301 40/517 |
| 2015/0029229 A1* | 1/2015 | Voutsas | G06F 1/1652 345/661 |
| 2016/0320804 A1* | 11/2016 | Takayanagi | G06F 1/1615 |
| 2016/0324021 A1* | 11/2016 | Takayanagi | G06F 1/1652 |
| 2019/0064881 A1* | 2/2019 | Kim | G02F 1/133305 |

* cited by examiner

FLEXIBLE DISPLAY DEVICE

CROSS REFERENCE TO RELATED APPLICATION

This application claims priority from Korean Patent Application No. 10-2017-0166353, filed on Dec. 6, 2017, which is hereby incorporated by reference for all purposes as if fully set forth herein.

BACKGROUND

Field of the Disclosure

The present disclosure relates to a display device, and more particularly, to a flexible display device capable of implementing a rollable display or a foldable display, which prevents the display panel from being scratched or damaged due to friction during rolling of the display panel.

Description of the Background

In general, as flat panel display devices, a liquid crystal display device, a plasma display device, a field emission display device, a light-emitting display device, and the like are being actively researched. However, the liquid crystal display device and the light-emitting display device are in the spotlight due to advantages of mass production technology, ease of driving means, and implementation of high image quality.

Recently, along with the research and development in terms of the technical shortcomings of flat panel display devices, needs for research and development are particularly emphasized in terms of the structural aspects of rolling-type or folder-type display products which are capable of attracting consumer attention. As illustrated in FIG. 1, a conventional rollable display device includes a display panel 110 configured to implement an image and a roller 120 around which the display panel 110 is wound.

However, such a rolling-type display device has a problem in that since a display panel has an ultra-thin structure for rolling, the display panel is vulnerable to an external impact, thereby being damaged.

In addition, at the time of rolling the display panel, since the display panel is wound in multiple layers, the display panel is scratched or damaged due to friction. This is a structure that increases the need for repair, which causes many complaints from consumers.

Accordingly, it has become necessary to conduct research to develop a flexible display device capable of realizing a rollable display or a foldable display in which the above-described problems do not occur.

SUMMARY

In view of the foregoing, an aspect of aspects disclosed herein is to provide a flexible display device capable of implementing a rollable display or a foldable display, in which it is possible to protect an ultra-thin display panel from an external impact, thereby preventing the display panel from being damaged.

Another aspect of aspects disclosed herein is to provide a flexible display device capable of implementing a rollable display or a foldable display, in which, at the time of rolling a display panel, the display panel can be prevented from being scratched or damaged by friction while the display panel is rolled in multiple layers.

Further, the aspect of the present disclosure is not limited thereto, and other unmentioned aspects of the present disclosure may be clearly appreciated by those skilled in the art from the following descriptions.

In order to achieve the above-mentioned aspects, aspects disclosed herein provide a flexible display device that includes a plurality of back bars coupled to the rear surface of a display panel, and a spacing member disposed up to a boundary between a non-display area and a display area such that the display panel can be prevented from being scratched and damaged by friction during the rolling of the display panel.

As described above, according to the aspects disclosed herein, in a flexible display device capable of implementing a rollable display or a foldable display, it is possible to protect an ultra-thin display panel from an external impact, thereby preventing the display panel from being damaged.

In addition, according to the aspects disclosed herein, in a flexible display device capable of implementing a rollable display or a foldable display, when rolling a display panel, it is possible to prevent the display panel from being scratched or damaged by friction while the display panel is wound in multiple layers.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
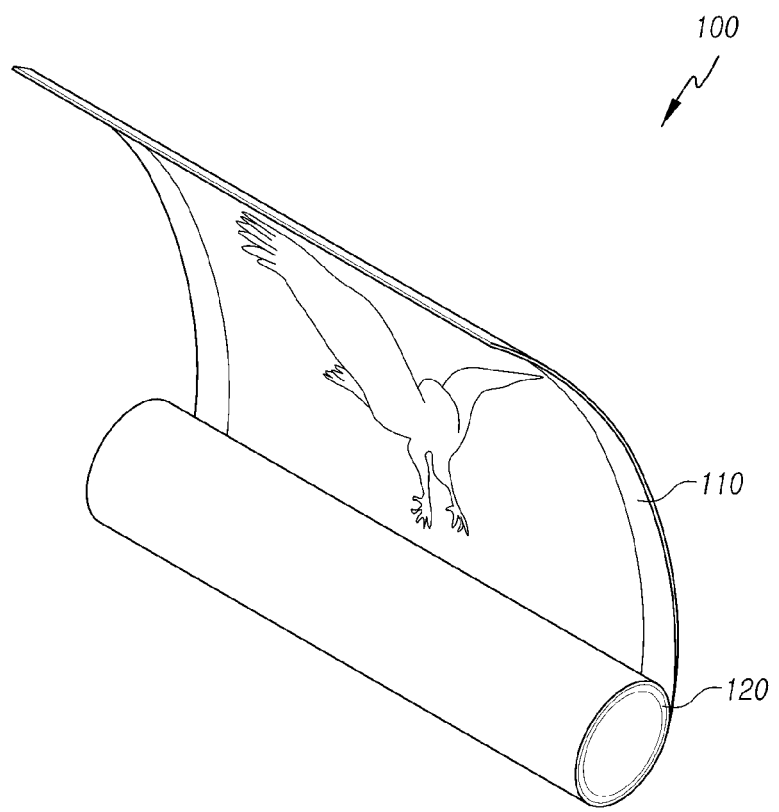
FIG. 1 is a perspective view schematically illustrating a conventional rollable display device.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
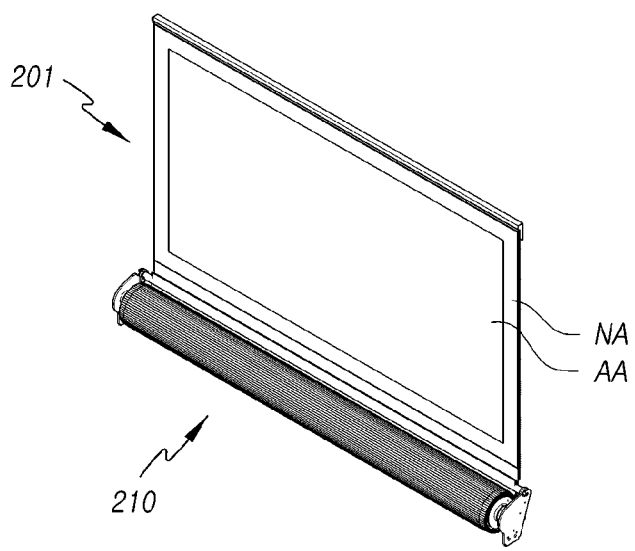
FIGS. 2 and 3 are perspective views each schematically illustrating a flexible display device according to aspects disclosed herein.
Figure 3:
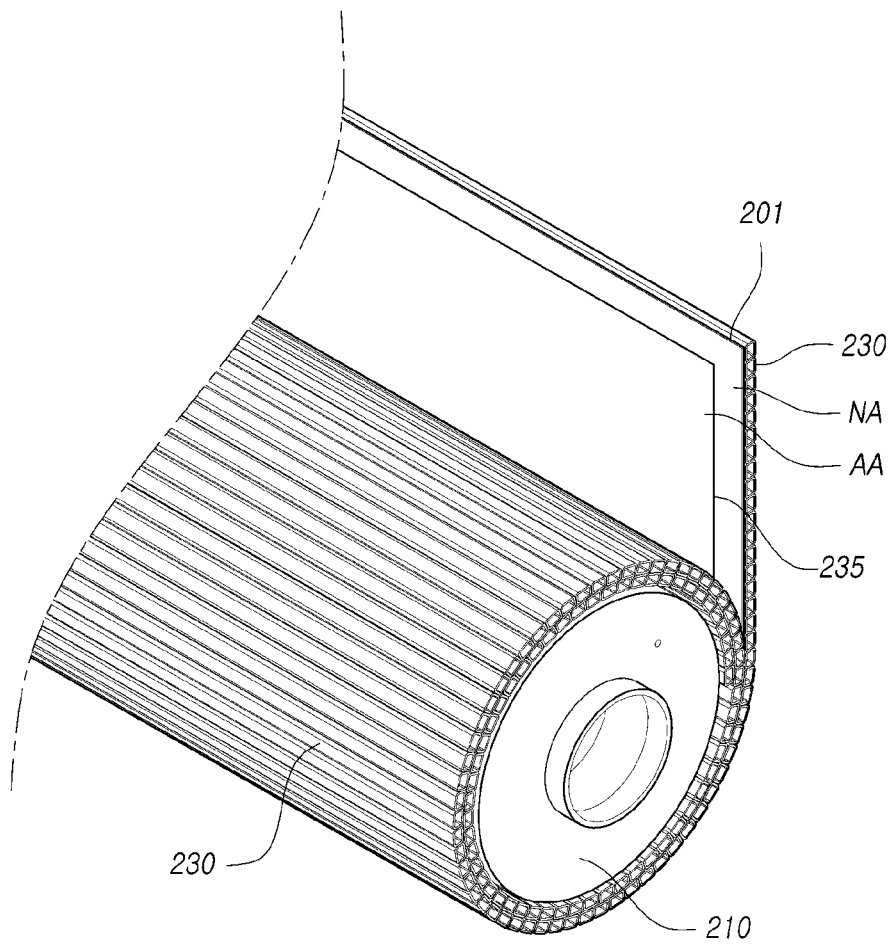
Figure 4:
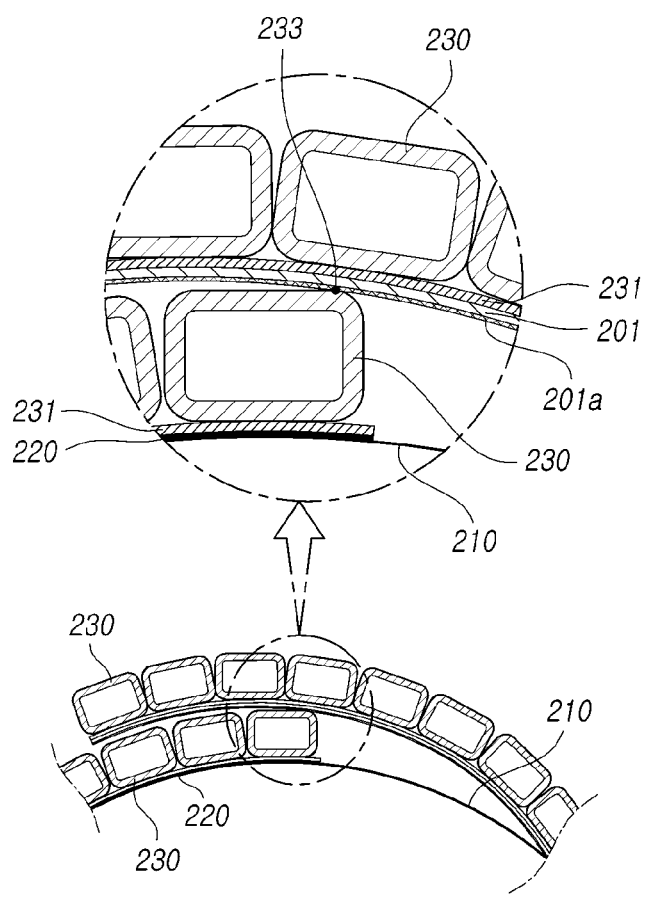
FIG. 4 is a cross-sectional view illustrating a part of a flexible display device according to the present aspects.
Figure 5:
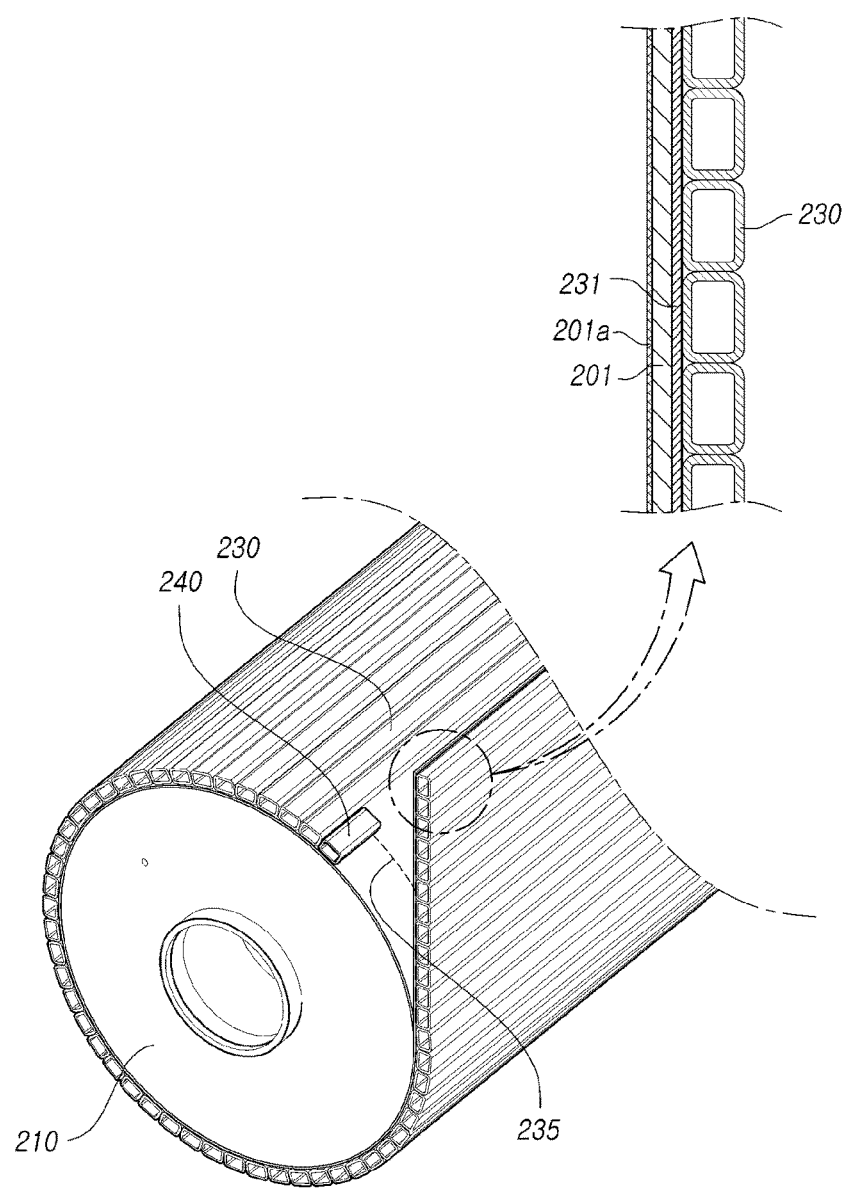
FIG. 5 is a perspective view illustrating a part of a flexible display device according to the present aspects.
Figure 6:
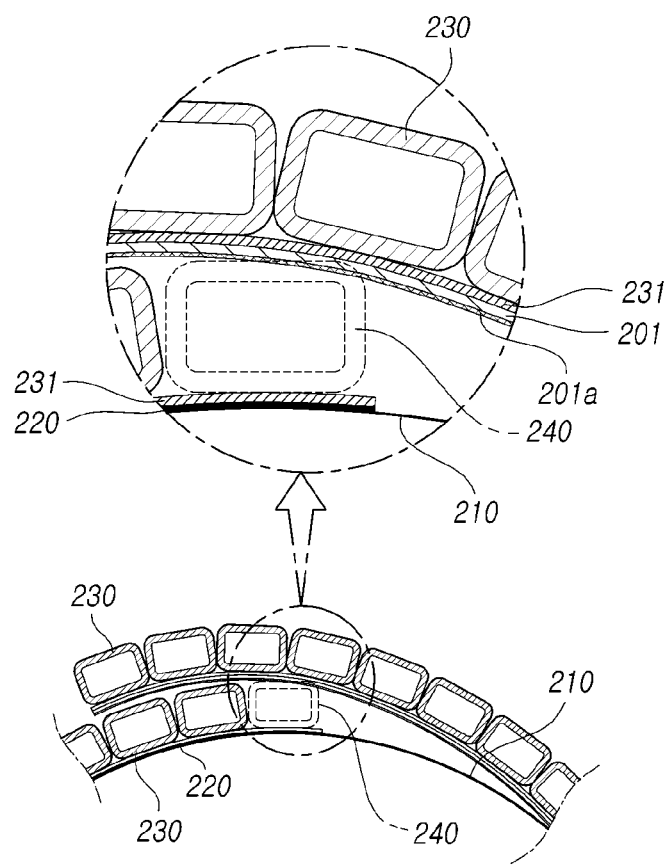
FIGS. 6 to 10 are cross-sectional views each illustrating a part of a flexible display device according to the present aspects.
Figure 7:
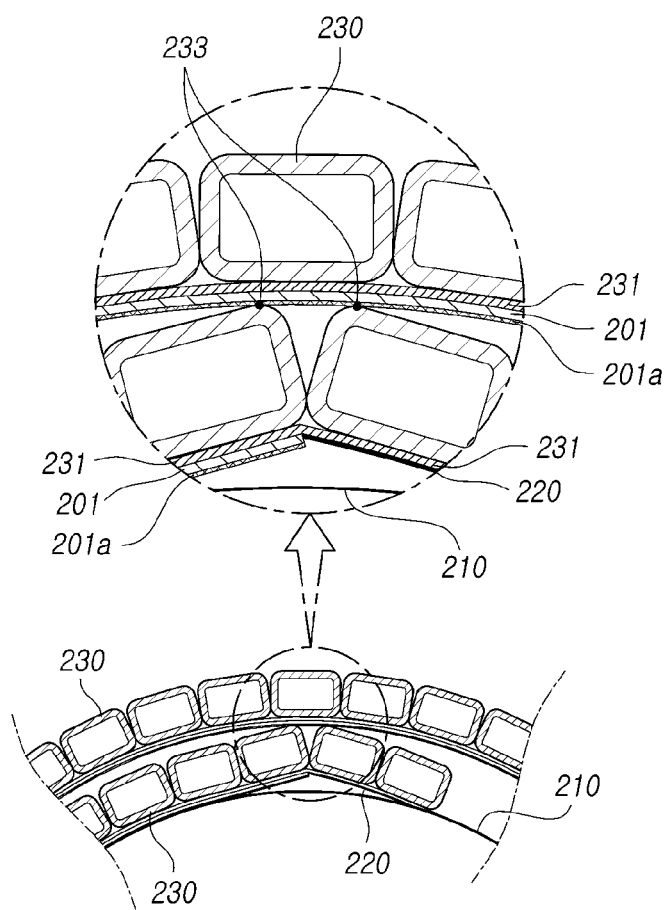

FIGS. 2 and 3 are perspective views each schematically illustrating a flexible display device according to the present aspects, FIG. 4 is a cross-sectional view illustrating a part of a flexible display device according to the present aspects, FIG. 5 is a perspective view illustrating a part of a flexible display device according to the present aspects, and FIGS. 6 to 10 are cross-sectional views each illustrating a part of a flexible display device according to the present aspects.

As illustrated in these drawings, a flexible display device 200 according to the present aspects includes: a display panel 201; a cylindrical roller 210 having an outer peripheral surface, around which the display panel 201 is wound; a connection member 220, one end of which is fixed to the outer peripheral surface of the roller 210, and a remaining end of which is connected to an end of the display panel 201; a plurality of back bars 230 coupled to rear surfaces of the display panel 201 and the connection member 220 and oriented in an opposite side end-to-side end direction of the display panel 201 and the connection member 220; and a spacing member 240 coupled to a rear surface of one end of the connection member 220 fixed to the outer peripheral surface of the roller 210 so as to be disposed from each of the opposite side ends of the connection member 220 up to a boundary portion 235 between a non-display area and a display area of the display panel 201.

Here, the present aspects are capable of implementing a rollable display device in which the display panel 201 and the back bars 230 are wound like a roller, or a foldable display device capable of being folded at a predetermined angle. In the present aspects, a rollable display device in which the display panel 201 and the back bars 230 are wound is illustrated as an example.

That is, the display device according to the present aspects is a flexible display device capable of implementing a rollable display or a foldable display.

In addition, in order to implement a rollable display or a foldable display, in the aspects of the present disclosure, the display panel 201 may be a liquid crystal display panel or may be applied irrespective of a light-emitting display panel.

Here, when the display panel 201 is configured with a liquid crystal display panel, the display panel 201 may further include a backlight unit configured to emit light to the liquid crystal display panel, a lower polarization plate attached to a lower substrate, and an upper polarization plate attached to the front surface of the upper substrate. The specific configurations of the lower substrate and the upper substrate may be formed in various forms known in the art depending on the driving mode of a liquid crystal panel, for example, a Twisted Nematic (TN) mode, a Vertical Alignment (VA) mode, an In-Plane Switching (IPS) mode, a Fringe Field Switching (FFS) mode, and the like.

In addition, when the display panel 201 is configured with a light-emitting display panel, the light-emitting display panel may include a lower substrate including a plurality of light-emitting cells each formed for a region defined by a gate line, a data line, and a power source VDD line, and an upper substrate facing and bonded to the lower substrate.

Each of the plurality of light emitting cells formed on the lower substrate may include at least one switching transistor connected to the gate line and the data line, at least one driving transistor connected to the switching transistor and the power supply (VDD) line, and a light-emitting element (e.g., an OLED) that emits light by a current controlled according to the switching of the driving transistor. The upper substrate may include a moisture absorbent or the like in order to protect the light emitting element from moisture or oxygen in the air.

In this case, the upper substrate may further include a light-emitting element connected to the driving transistor. In this case, the light emitting element of the lower substrate may be omitted.

In the present aspects, the light-emitting display panel 201 is illustrated as an example, but does not illustrate a back-light unit that emits light to a panel due to the self-light emission structure. Hereinafter, descriptions will be made based on the light-emitting display panel 201.

An organic compound in the pixel array of the light-emitting display panel may deteriorate when exposed to moisture or oxygen. Thus, in order to prevent such a pixel deterioration problem, an encapsulation member may be bonded to the rear surface of the display panel 201 so as to seal the pixel array.

In order to prevent a light leakage phenomenon in which light emitted from the pixel array is emitted through a side surface, a side seal member made of a polymer material to which a black pigment is added may be provided on the side surface of the display panel 201.

In addition, on the rear surface of at least one end of the display panel 201 formed in a rectangular shape, a plurality of flexible circuit films on which ICs are mounted are electrically connected to the display panel 201 and the printed circuit board.

Further, the plurality of flexible circuit films may be attached to the display panel 201 and the printed circuit board using a resin or the like through a Tape Automated Bonding (TAB) process, and may be formed of a Tape Cather Package (TCP), or a Chip on Flexible board or Chip on Film (COF).

Accordingly, the display panel 201 is electrically joined or connected to the printed circuit board through a plurality of flexible circuit films, and the printed circuit board is electrically connected to the plurality of flexible circuit films so as to provide various signals for displaying an image on the display panel 201.

The printed circuit board is electrically connected to a plurality of circuit films so as to provide various signals for displaying an image on the display panel 201. A driving IC configured to drive the display panel 201 is mounted on the printed circuit board.

In the present aspects, in order for the display panel 201 to wound around a cylindrical roller 210 so as to form multiple layers in the radial direction, one end of the connection member 220 is fixed to the outer peripheral surface of the roller 210 and the remaining end of the connection member 220 is connected to an end of the display panel 201.

In addition, since the plurality of back bars 230, are provided on the rear surfaces of the display panel 201 and the connection member 220 to be oriented in the opposite side end-to-side end direction of the display panel 201, the display panel 201 maintains the curvature thereof by a support force of the back bars 230 when the display panel 201 is wound around the roller 210.

Here, the back bars 230 have a hollow rectangular cross section and is elongated in the opposite side end-to-side end direction of the display panel 201. Thus, when the display panel 201 is wound around the roller 210 in multiple layers, the back bars 230 support the display panel 201 to maintain the curvature thereof.

A polarization film 201a is bonded to the front surface of the display panel 201. When the display panel 201 is wound around the roller 210 so as to form multiple layers in the radial direction, due to a height difference between the roller 210 and the back bars 230 at a position where the back bars 230 are initially provided, the edges 233 of the back bars 230 come into contact with and rub against the polarization film 201a of the display panel 201, which may cause the polarization film 201a of the display panel 201 to be scratched and damaged.

The spacing member 240 is coupled to the rear surface of one end of the connection member 220 fixed to the outer peripheral surface of the roller 210 in order to protect the polarization film 201a. Such a spacing member 240 is disposed from each of the opposite side ends of the connection member 220 up to the boundary portion 235 between the non-display area NA and the display area AA of the display panel 201.

Accordingly, when the display panel 201 is wound around the roller 210 so as to form multiple layers in the radial direction, only the non-display areas NA at the opposite sides of the display panel 201 are supported by the spacing members 240 and the inner display area AA is provided with a space separated from the back bars 230. Thus, the polarization film 201a in the display area AA can be prevented from being scratched and damaged.

Between the rear surface of the display panel 201 and the front surfaces of the back bars 230, between the rear surface of the connection member 220 and the front surfaces of the back bars 230, and between the rear surface of the connection member 220 and the front surface of the spacing members 240, adhesive members 231 are provided, so that the back bars 230 can support the display panel 201 at predetermined positions without being pushed and moved in any direction.

Here, double-faced tape, adhesive heat-conductive tape, or the like may be used as the adhesive members 231 for preventing the back bars 210 from being pushed and moved.

The connection member 220, which connects the display panel 201 and the roller 210, is formed of a plastic material such as polyethylene terephthalate (PET), polyethylene (PE), or polypropylene (PP). Since the connection member 220 is small in thickness and is poor in bending strength compared with the display panel 201, a portion of the connection member 220 connected to the end of the display panel 201 may protrude outward and may be bent during rolling.

Thus, the back bars 230 are respectively disposed on the display panel 201 and the connection member 220, which are in opposite directions with respect to a connection portion where the display panel 201 and the connection member 220 are connected to each other, and the back bars 230 may be fixed by a fixing member 250.

By fixing the back bars 230 at the opposite sides of, with the fixing member 250, the connection portion in which the display panel 201 and the connection member 220 are connected to each other as described above, bending of the connection portion, in which the end of the display panel 201 and the connection member 220 are connected to each other, may not protrude to the outside. Thus, scratches and damage due to friction between the polarization film 201a of the display panel 201 and the back bars 230 are reduced.

Figure 8:
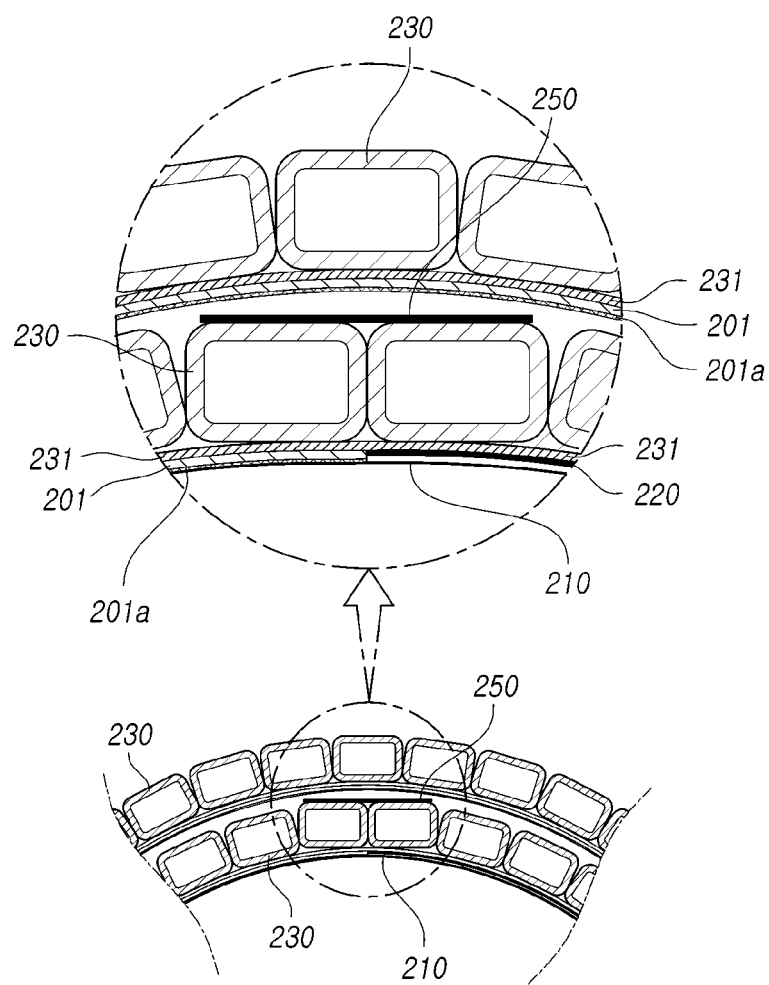

The fixing member 250 may be provided on at least one of the outer peripheral surfaces and the side surfaces of the back bars 230 disposed on the display panel 201 and the connection member 220 with respect to the connection portion. FIG. 8 illustrates the case in which the fixing member 250 is provided on the outer peripheral surfaces of the back bars 230, as an example.

Here, the fixing member 250 may be provided by applying an adhesive to a metal plate or a plastic plate and attaching the metal plate or the plastic plate to the outer peripheral surfaces of the back bars 230, or by directly attaching an adhesive tape to the outer peripheral surfaces of the back bars 230. When the fixing member 250 is provided on the side surfaces of the back bars 230, an adhesive may be applied to the opposite side surfaces of the metal plate or the plastic plate, or a double-sided adhesive tape may be attached.

Figure 9:
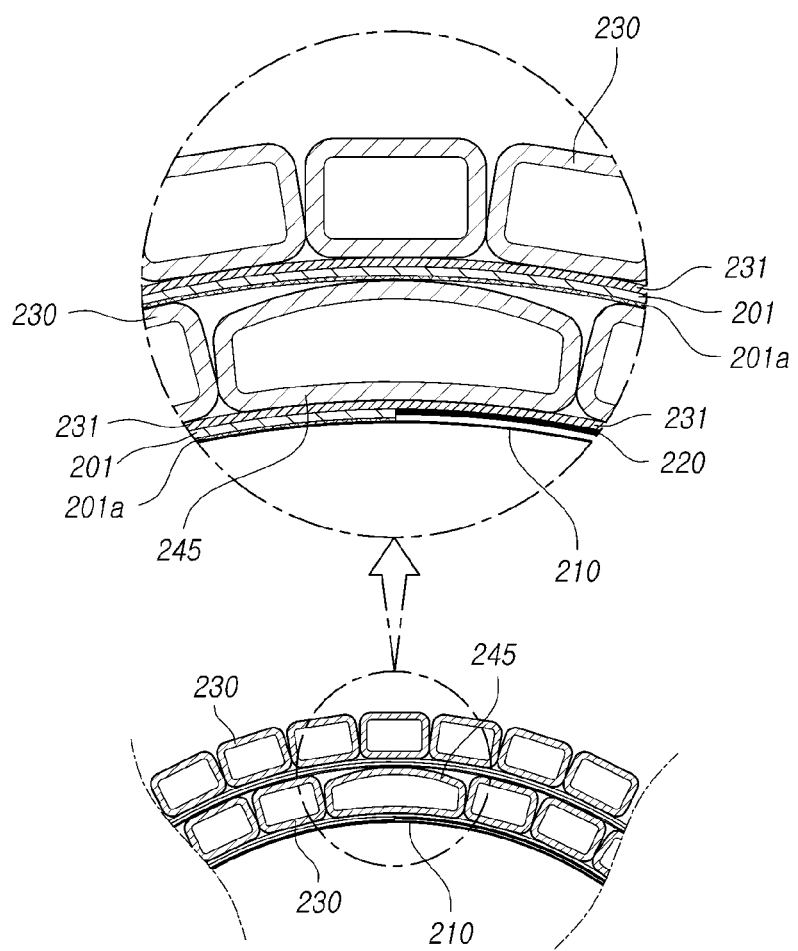

In addition, as illustrated in FIG. 9, with respect to the connection portion, in which the display panel 201 and the connection member 220 are connected to each other, a wide back bar 245 may be provided, one end of which is positioned on the display panel 201 and the other end of which is positioned on the connection member 220.

In addition, due to the wide back bar 245, the connection portion, in which the end portions of the display panel 201 and the connection member 220 are connected to each other, can be prevented from being bent to the outside.

That is, by coupling the wide back bar 245, which is wider than the ordinary back bars 230, to be supported together on both of the opposite areas of the display panel 201 and the connection member 220, it is possible to prevent the connection portion from being bent.

In addition, by forming the wide back bar 245 to have a convex curved outer peripheral surface so as to minimize the contact area with the display panel 201 wound to form multiple layers in the radial direction of the roller 210, it is possible to minimize friction and scratching of the polarization film 201a.

Meanwhile, the flexible display device according to the present aspects may include a display panel 201, a cylindrical roller 210 having an outer peripheral surface, around which the display panel 201 is wound, a connection member 220, one end of which is fixed to the outer peripheral surface of the roller 210 and the other end of which is connected to an end of the display panel 201, and a plurality of back bars 230 coupled to the rear surfaces of the display panel 201 and the connection member 220 and oriented in the opposite side end-to-side end direction of the display panel 201 and the connection member 220. The back bars 230a, 230b, and 230c, disposed adjacent to one end of the connection member 220, may be provided such that the heights thereof are sequentially lowered towards the one end of the connection member 220.

Here, since the display panel 201, the roller 210, the connection member 220, and the like are the same as those described above, a detailed description will be omitted.

In the flexible display device as in the present aspects, when the display panel 201 is wound around the roller 210 to form multiple layers in the radial direction, due to a height difference between the roller 210 and the back bars 230 at a position where the back bars 230 are initially provided, the edges of the back bars 230 come into contact with and rub against the polarization film 201a of the display panel 201, which may cause the polarization film 201a of the display panel 201 to be scratched and damaged.

Figure 10:
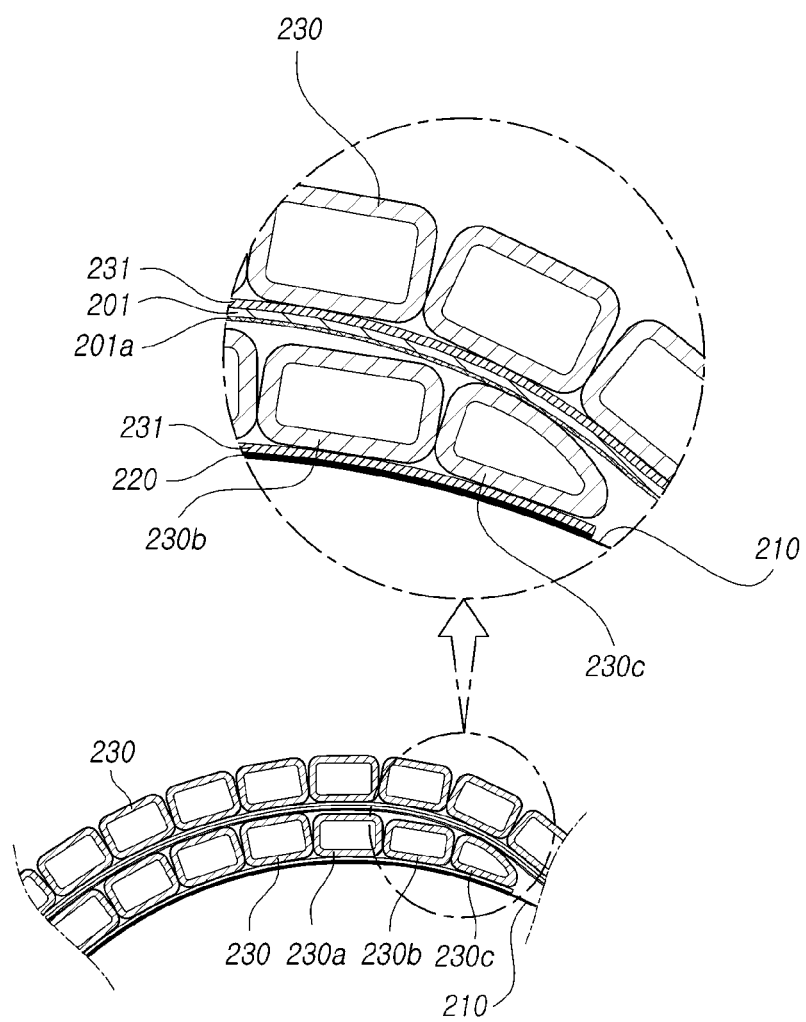

In order to protect the polarization film 201a, as illustrated in FIG. 10, the back bars 230a, 230b, and 230c, disposed adjacent to one end of the connection member 220, are provided such that the heights thereof are sequentially lowered towards the one end of the connection member 220.

Accordingly, when the display panel 201 is wound on the roller 210 so as to form multiple layers in the radial direction, the heights of the back bars 230 sequentially increase from one end of the connection member 220, so that a level difference between the back bars 230 and the display panel 201 can be reduced, and thus scratches and damage of the polarization film 201a can be minimized.

In addition, the back bar 230c disposed nearest to the one end of the connection member 220 may be formed in a wedge shape having a convex outer peripheral surface, so that a level difference with the display panel 201 wound to form multiple layers in the radial direction can be minimized, and thus friction and scratches caused thereby can be minimized.

In addition, as illustrated in FIG. 8, the back bars 230 are respectively disposed on the display panel 201 and the connection member 220, which are in opposite directions with respect to a connection portion where the display panel 201 and the connection member 220 are connected to each other, and the back bars 230 may be fixed by a fixing member 250.

By fixing the back bars 230 at the opposite sides of, with the fixing member 250, the connection portion in which the display panel 201 and the connection member 220 are connected to each other as described above, bending of the connection portion, in which the end of the display panel 201 and the connection member 220 are connected to each other, may not protrude to the outside. Thus, scratches and damage due to friction between the polarization film 201a of the display panel 201 and the back bars 230 are reduced.

The fixing member 250 may be provided on at least one of the outer peripheral surfaces and the side surfaces of the back bars 230 disposed on the display panel 201 and the connection member 220 with respect to the connection portion. FIG. 8 illustrates the case in which the fixing member 250 is provided on the outer peripheral surfaces of the back bars 230, as an example.

Here, the fixing member 250 may be provided by applying an adhesive to a metal plate or a plastic plate and attaching the metal plate or the plastic plate to the outer peripheral surfaces of the back bars 230, or by directly attaching an adhesive tape to the outer peripheral surfaces of the back bars 230. When the fixing member 250 is provided on the side surfaces of the back bars 230, an adhesive may be applied to the opposite side surfaces of the metal plate or the plastic plate, or a double-sided adhesive tape may be attached.

In addition, as illustrated in FIG. 9 described above, with respect to the connection portion, in which the display panel 201 and the connection member 220 are connected to each other, a wide back bar 245 may be provided, one end of which is positioned on the display panel 201 and the other end of which is positioned on the connection member 220, so that the connection portion, in which the end portions of the display panel 201 and the connection member 220 are connected to each other, can be prevented from being bent to the outside.

That is, by coupling the wide back bar 245, which is wider than the ordinary back bars 230, to be supported on both of the opposite areas of the display panel 201 and the connection member 220, it is possible to prevent the connection portion from being bent.

In addition, by forming such a wide back bar 245 to have a convex curved outer peripheral surface, the contact area thereof with the display panel 201 wound to form multiple layers in the radial direction of the roller 210 can be minimized, and friction and scratches caused thereby can be minimized.

Meanwhile, the drawings of the present aspects illustrate only a case where the display panel is a light-emitting display panel, as an example. However, as described above, the present aspects are also applicable to a case where the display panel is a liquid crystal display panel. In this case, the backlight module, which provides light to the liquid crystal display panel includes a light source module, and a light guide plate configured to process the light emitted from the light source module so as to provide appropriate light to the liquid crystal display panel, a light adjustment member, and a light reflector. Here, the light source module is a component that converts electric energy into light energy, and components such as a Light-Emitting Diode (LED) assembly, a Cold Cathode Fluorescent Lamp (CCFL), or a Hot Cathode Fluorescent Lamp (HCFL) may be used. Since this is well known in the art to which the present aspects belong, a detailed description thereof will be omitted.

As described above, according to the aspects disclosed herein, in a flexible display device capable of implementing a rollable display or a foldable display, it is possible to protect an ultra-thin display panel from an external impact, thereby preventing the display panel from being damaged.

In addition, according to the aspects disclosed herein, in a flexible display device capable of implementing a rollable display or a foldable display, when rolling a display panel, it is possible to prevent the display panel from being scratched or damaged by friction while the display panel is wound in multiple layers.

Even if it was described above that all of the components of an aspect of the present disclosure are coupled as a single unit or coupled to be operated as a single unit, the present disclosure is not necessarily limited to such an aspect. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although an aspect of the present disclosure has been described for illustrative purposes, those skilled in the art will appreciate that various modifications, additions and substitutions are possible, without departing from the scope and spirit of the disclosure as disclosed in the accompanying claims. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:
1. A flexible display device comprising:
   a display panel;
   a cylindrical roller having an outer peripheral surface on which the display panel is rolled and unrolled;
   a connection member having a first end attached to the outer peripheral surface of the cylindrical roller and a second end connected to an end of the display panel;

a plurality of back bars coupled to rear surfaces of the display panel and the connection member and disposed in a horizontal direction with respect to a longer side of the display panel; and a spacing member coupled to a rear surface of the one end of the connection member and disposed from each of both side ends of the connection member to a boundary between a non-display area and a display area of the display panel.

2. The flexible display device of claim 1, further comprising adhesive members provided between the rear surface of the display panel and front surfaces of the back bars, between the rear surface of the connection member and the front surfaces of the back bars, and between the rear surface of the connection member and a front surface of the spacing member.

3. The flexible display device of claim 1, further comprising a fixing member securing the plurality of back bars disposed on the display panel and the connection member with respect to a connection portion where the end of the display panel and the connection member are connected to each other.

4. The flexible display device of claim 3, wherein the fixing member is provided on at least one of outer peripheral surfaces and side surfaces of the plurality of back bars, which are disposed on the display panel and the connection member with respect to the connection member.

5. The flexible display device of claim 1, further comprising a wide back bar having first and second ends with respect to a connection portion where the end of the display panel and the connection member are connected to each other.

6. The flexible display device of claim 5, wherein the first end of the wide back bar is positioned on the display panel and the second end of the wide back bar is positioned on the connection member.

7. The flexible display device of claim 5, wherein the wide back bar has an outer peripheral surface with a convex curved shape.

8. A flexible display device comprising:
a display panel;
a cylindrical roller having an outer peripheral surface on which the display panel is rolled and unrolled;
a connection member having a first end fixed to the outer peripheral surface of the cylindrical roller and a second end connected to an end of the display panel; and
a plurality of back bars coupled to rear surfaces of the display panel and the connection member and disposed in a horizontal direction with respect to a longer side of the display panel,
wherein the plurality of back bars adjacent to the first end of the connection member has a height sequentially reduced toward the first end of connection member.

9. The flexible display device of claim 8, wherein the plurality of back bar includes a back bar disposed closest to the first end of the connection member having a wedge shape with a convex outer surface.

10. The flexible display device of claim 8, further comprising a fixing member respectively securing the plurality of back bars disposed on the display panel and the connection member with respect to a connection portion where the end of the display panel and the connection member are connected to each other.

11. The flexible display device of claim 10, wherein the fixing member is provided on at least one of an outer peripheral surface and a side surface of the plurality of back bars respectively disposed on the display panel and the connection member with respect to the connection member.

12. The flexible display device of claim 8, further comprising a wide back bar having a first end and a second end with respect to a connection portion where the end of the display panel and the connection member are connected to each other.

13. The flexible display device of claim 12, wherein the first end of the wide back bar is disposed on the display panel and the second end of the wide back bar is disposed on the connection member.

14. The flexible display device of claim 12, wherein the wide back bar has an outer peripheral surface with a convex curved shape.

15. A flexible display device comprising:
a display panel;
a cylindrical roller having an outer peripheral surface, around which the display panel is wound;
a connection member having a first end fixed to the outer peripheral surface of the cylindrical roller and a second end connected to the display panel;
a plurality of back bars coupled to rear surfaces of the display panel and the connection member and disposed in an extending direction of the cylindrical roller; and
a fixing member configured to fix at least two adjacent back bars disposed on the display panel and the connection member with respect to a connection portion where the display panel and the connection member are connected to each other, so as to prevent the connection portion from protruding to outside when the connection member and the display panel are wound around the outer peripheral surface of the cylindrical roller.

16. The flexible display device of claim 15, wherein back bars adjacent to the first end of the connection member have heights sequentially lowered toward the first end of connection member.

17. The flexible display device of claim 15, wherein the plurality of back bars includes a back bar disposed closest to the first end of the connection member and having a convex outer surface with a wedge shape inclined towards the first end of the connection member.

18. The flexible display device of claim 15, wherein the fixing member is provided on at least one of an outer peripheral surface and a side surface of the at least two adjacent back bars disposed on the display panel and the connection member with respect to the connection portion.

19. A flexible display device comprising:
a display panel;
a cylindrical roller having an outer peripheral surface, around which the display panel is wound;
a connection member having a first end fixed to the outer peripheral surface of the cylindrical roller and a second end connected to the display panel;
a plurality of back bars coupled to rear surfaces of the display panel and the connection member and disposed in an extending direction of the cylindrical roller; and
a wide back bar having first and second ends with respect to a connection portion where the display panel and the connection member are connected to each other, and disposed in the extending direction of the cylindrical roller.

20. The flexible display device of claim 19, wherein the first end of the wide back bar is disposed on the display panel and the second end of the wide back bar is disposed on the connection member.

21. The flexible display device of claim 20, wherein the wide back bar has an outer peripheral surface with a convex curved shape.

22. The flexible display device of claim 19, wherein back bars adjacent to the first end of the connection member have heights sequentially lowered toward the first end of connection member.

23. The flexible display device of claim 19, wherein the plurality of back bars includes a back bar disposed closest to the first end of the connection member and having a convex outer surface with a wedge shape inclined towards the first end of the connection member.

* * * * *